United States Patent
Bonhote et al.

(10) Patent No.: US 7,748,104 B2
(45) Date of Patent: Jul. 6, 2010

(54) STRUCTURE AND METHOD FOR REDUCED CORROSION OF AUXILIARY POLES DURING THE FABRICATION OF PERPENDICULAR WRITE HEADS

(75) Inventors: Christian Rene Bonhote, San Jose, CA (US); Quang Le, San Jose, CA (US); Jui-Lung Li, San Jose, CA (US); Scott Arthur MacDonald, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 412 days.

(21) Appl. No.: 11/411,562

(22) Filed: Apr. 25, 2006

(65) Prior Publication Data

US 2007/0247749 A1 Oct. 25, 2007

(51) Int. Cl.
G11B 5/127 (2006.01)
H04R 31/00 (2006.01)

(52) U.S. Cl. .......... 29/603.16; 29/603.07; 29/603.14; 29/603.15; 29/603.18; 360/121; 360/122; 360/317; 216/62; 216/65; 216/66; 451/5; 451/41

(58) Field of Classification Search ........... 360/119.02, 360/119.03, 119.04, 119.07, 19.09, 119.1, 360/317, 125.39, 125.43, 125.63, 125.35; 438/3; 29/603.07, 603.13–603.16, 603.18
See application file for complete search history.

(56) References Cited

U.S. PATENT DOCUMENTS

| | | | |
|---|---|---|---|
| 4,651,248 A | 3/1987 | Shiiki et al. | |
| 4,907,113 A | 3/1990 | Mallary | |
| 5,995,342 A * | 11/1999 | Cohen et al. | 360/125.35 |
| 6,169,642 B1 * | 1/2001 | Mino et al. | 360/125.43 |
| 6,404,601 B1 * | 6/2002 | Rottmayer et al. | 360/317 |
| 6,456,461 B1 | 9/2002 | Sato | |
| 6,515,825 B1 | 2/2003 | Sato | |
| 6,737,281 B1 * | 5/2004 | Dang et al. | 438/3 |
| 6,807,027 B2 | 10/2004 | McGeehin et al. | |
| 6,851,178 B2 | 2/2005 | Han et al. | |
| 6,887,355 B2 * | 5/2005 | Han et al. | 204/192.34 |
| 6,970,324 B2 * | 11/2005 | Ikeda et al. | 360/125.63 |
| 7,218,475 B2 * | 5/2007 | Matono et al. | 360/125.39 |
| 2002/0093772 A1 * | 7/2002 | Yoshida et al. | 360/317 |
| 2004/0240110 A1 | 12/2004 | Matono | |
| 2004/0257702 A1 | 12/2004 | Kimura et al. | |
| 2005/0047015 A1 | 3/2005 | Matono et al. | |

(Continued)

FOREIGN PATENT DOCUMENTS

JP 1315015 12/1989

(Continued)

Primary Examiner—Paul D Kim
(74) Attorney, Agent, or Firm—D'Arcy H. Lorimer; Lorimer Labs

(57) ABSTRACT

A method and structure for reducing corrosion during the manufacture of perpendicular write heads is disclosed. Auxiliary pole structures (otherwise known as trailing shields and wrap around shields) are susceptible to corrosion due to their iron containing composition and small dimensions. The impact of corrosion can be reduced by utilizing a gap material comprising an upper surface of noble metals, which extends from underneath the auxiliary pole and is exposed to the same corrosive environment during processing. The area of the exposed gap material is limited to optimize corrosion protection.

13 Claims, 6 Drawing Sheets

U.S. PATENT DOCUMENTS

| | | |
|---|---|---|
| 2005/0068665 A1 | 3/2005 | Le et al. |
| 2005/0068673 A1 | 3/2005 | Lille |
| 2005/0083607 A1 | 4/2005 | Sasaki et al. |
| 2005/0105212 A1 | 5/2005 | Sato |
| 2005/0185340 A1 | 8/2005 | Kobayashi |

FOREIGN PATENT DOCUMENTS

| | | |
|---|---|---|
| JP | 3241511 | 10/1991 |

* cited by examiner

STRUCTURE AND METHOD FOR REDUCED CORROSION OF AUXILIARY POLES DURING THE FABRICATION OF PERPENDICULAR WRITE HEADS

BACKGROUND OF THE INVENTION

1. Field of the Invention

This invention relates to structures and methods for fabricating perpendicular write heads. More specifically, the invention relates to structures and methods for reducing corrosion of trailing shield and wrap around shield (auxiliary pole) structures during the fabrication of perpendicular write heads.

2. Description of the Related Art

During the manufacture of perpendicular write head structures, particularly those that contain trailing shields (also known as auxiliary poles), it has been observed that corrosion of the trailing shields may occur subsequent to the deposition of these structures by electroplating. This corrosion can occur very quickly, before protective encapsulation can be applied. Due to the small dimensions of the trailing shields, any pitting or corrosion can significantly impact proper operation. For example, the specified throat height (the thickness of the shield at the ABS) of a trailing shield near the write pole is typically 50 nm or 500 angstroms. Even microscopic amounts of corrosion of the iron containing alloys comprising the trailing shield can make obtaining the design target throat height difficult to achieve when forming the air bearing surface. What is needed is a structure and method to prevent corrosion of auxiliary poles during the fabrication of perpendicular write heads.

FIGS. 1-4 (Prior Art) are exemplary of the prior art disclosed in United States Patent Application Publications 2005/0068673 and 2005/0068665.

United States Patent Application Publication 2005/0068673 discloses a head structure having a write head portion for writing data to magnetic media. The write head portion includes a first pole piece with a first pole tip, a probe pole piece having a probe pole tip for emitting magnetic flux from an ABS end thereof, an insulation stack positioned between the pole pieces, at least one write coil embedded in the insulation stack, a shaping layer positioned between the probe pole piece and the insulation stack for focusing flux to the probe pole tip, a trailing shield spaced apart from the pole, the trailing shield causing the magnetic flux to enter the media at an angle from a plane perpendicular to a surface of the media facing the pole, and a return pole piece.

United States Patent Application Publication 2005/0068665 discloses a method and materials to fabricate a trailing shield write pole that resolve the problems of controlling the write gap and preventing damages to the write gap or pole during fabrication of the subsequent structure. This process also introduces a CMP assisted lift-off process to remove re-deposition and fencing (increase yields) and a method to create dishing in the top of the write pole. Moreover, also included in this disclosure are suitable materials that can function as an ion mill transfer layer, CMP layer, and RIEable layer.

FIG. 1 (Prior Art) is partial cross sectional view 100 of a perpendicular write pole prior to deposition of the trailing shield structure. Non-magnetic gap layer 102 is situated above pole tip 106 and shaping layer 108. Gap materials may be alumina, Rh or Ru. Mask layer 104 is deposited prior to the trailing shield (FIG. 2), covering gap 102. FIG. 2 (Prior Art) is partial cross sectional view 200 of a perpendicular write pole subsequent to deposition of trailing shield structure 202. Note that gap layer 102 is completely covered by mask layer 104, which remains within the head structure after subsequent deposition of the trailing shield. FIG. 3 (Prior Art) is a partial cross sectional view 300 of a perpendicular write pole subsequent to deposition of a return layer 302, which is deposited over mask 104. FIG. 4 (Prior Art) is a cross sectional view 400 of a read/write head structure employing a trailing shield 202. The read head comprises first shield later 410, read sensor 408, and second shield layer 406. The write head comprises coils 404, backgap 402, gap 102, mask 104, trailing shield 202, and return layer 302. This structure has been found to sensitive to corrosion of the trailing shield, particularly due to the extension of gap 102 layer all the way to the backgap area, particularly for gap materials of Rh and Ru. This is due to an electrochemical corrosion couple that can corrode the trailing shield 202 quickly after plating.

United States Patent Application Publication 20050105212 discloses a magnetic head including a plurality of coil elements disposed in a space defined by a lower core layer, a pole layer, and a back gap layer. A coil insulator fills the space so as to cover the coil elements. The top face of the pole layer, the top face of the coil insulator, the top faces of the coil elements, and the top face of the back gap layer form a planarized plane. The coil elements are disposed on a recess formed on the lower core layer. The bottom faces of the coil elements are disposed at substantially the same height as the top face of the lower core layer. The top faces of the coil elements lie in the planarized plane.

United States Patent Application Publication 2005/0185340 discloses a first magnetic layer formed on a first magnetic layer formation surface, and then a first material layer-forming layer is deposited on the first magnetic layer formation surface and on the sides and the top of the first magnetic layer and is etched to form first material layers so that the width dimension of each first material layer in the track width direction gradually decreases in the upward direction. Then, a second material layer is formed over the first material layer formation surface, the first material layers, and the first magnetic layer. Then, the first material layers, the second material layer, and the first magnetic layer are polished to expose the upper surface of the first magnetic layer and form the upper surfaces of the second material layer and the first magnetic layer as the same planarized surface.

United States Patent Application Publication 2005/0083607 discloses an improvement of a write element of a thin film magnetic head. The first pole portion projects from a flat surface of a first yoke portion at a medium-facing surface side and having a reduced width at its upper end. The second pole portion faces the upper end of the first pole portion, having the same width as the upper end of the first pole portion, with the gap film interposed between the second pole portion and the upper end of the first pole portion. The first pole portion includes a magnetic film adjacent to the gap film, the magnetic film etched at both sides in width direction to have a narrowed portion having substantially the same width as the second pole portion, and a base portion connected to the narrowed portion, increasing in thickness toward the narrowed portion.

United States Patent Application Publication 2005/0047015 discloses a thin film magnetic head capable of reducing the amount of protrusion of a write shield layer, thereby preventing a collision with a recording medium, and thereby ensuring a recording operation with stability. A heat sink layer is disposed on the leading side of a thin film coil in order to dissipate heat produced by the thin film coil. When the thin film coil produces heat during the recording of information, priority is given to the guidance of the heat to the leading side of the thin film coil, namely, the side opposite to the position of the write shield layer, rather than the guidance of the heat to the trailing side of the thin film coil, namely, the position of the write shield layer, so as to dissipate the heat. Thus, the thin film magnetic head reduces the likelihood of the heat accumulating in the write shield layer, thus reduces the likelihood of the write shield layer expanding thermally, and thus reduces the amount of protrusion of the write shield layer.

United States Patent Application Publication 2004/0240110 discloses a thin film magnetic head achieving improved recording performance by sharpening recording magnetic field gradient as much as possible. The thin film magnetic head has a return yoke layer disposed on a trailing side of a magnetic pole layer, and width W3 of an exposed surface of a lower TH specifying part in a TH specifying portion in the return yoke layer is equal to or larger than width W1 of an exposed surface of the magnetic pole layer (W3W1), and is less than width W4 of an exposed surface of an upper TH specifying part (W3<W4). Since a part (magnetic flux) of a magnetic flux emitted from the exposed surface to the outside flows in the exposed surface while being spread a little in the width direction, spread of the magnetic flux is suppressed at the time of recording. Therefore, the recording magnetic field gradient near an air bearing surface is sharpened and recording performance is improved.

United States Patent Application Publication 2004/0257702 discloses a thin-film magnetic recording head suitable for high density recording and its fabrication method elaborated to avoid corrosion of the main pole section of the head. A non-magnetic metal layer is formed on the top of the main pole.

U.S. Pat. No. 6,851,178 discloses that one of the major requirements for higher frequency extendability is to reduce yoke length and inductance in order to have fast saturation. This has been accomplished by using a design that provides a cavity in the lower pole piece inside which is located at least two coils, one on top of the other. A process for manufacturing the device is also described.

U.S. Pat. No. 6,807,027 discloses a perpendicular write head including a main pole, a return pole, and conductive coils. The main pole includes a seedlayer and a magnetic layer that is plated upon the seedlayer. The seedlayer is nonmagnetic, electrically conductive, and corrosion-resistant. The return pole is separated from the main pole by a gap at an air bearing surface of the write head and is coupled to the main pole opposite the air bearing surface. The conductive coils are positioned at least in part between the main pole and the return pole.

U.S. Pat. No. 6,515,825 discloses a thin film magnetic head in which a first coil layer is formed at the back of a track width control portion. The first coil layer being located nearer a bottom core layer than the junction surface of a track width control portion and an upper core layer. With a two-layer structure, the width of the coil layer can be decreased. The height from the top of the bottom core layer to the top of an insulating layer can be decreased. The insulating layer covering a second coil layer can be decreased, thereby shortening the magnetic path and decreasing inductance.

U.S. Pat. No. 6,456,461 discloses a thin-film magnetic head including an upper core layer and a lower core layer, extending from a back region to a magnetic pole region, and ends thereof being disposed at a medium-opposing face; a gap layer disposed in the magnetic pole region between the upper core layer and the lower core layer; a groove formed in an insulating layer formed on the lower core layer, the groove extending from the medium-opposing face in the magnetic pole region to the back region; and a lower magnetic pole layer, the gap layer, and an upper magnetic pole layer in the groove. In the thin-film magnetic head, the lower magnetic pole layer and the lower core layer are connected to each other, the upper magnetic pole layer and the upper core layer are connected to each other, and the groove comprises a groove body portion which has a cross-sectional size approximately equivalent to that of an opening of the groove at the medium-opposing face and extends in the magnetic pole region, and a groove-continuing portion which continues from the groove body portion and extends in the back region.

U.S. Pat. No. 4,651,248 discloses a thin-film magnetic head which has a structure wherein a spiral conductor coil having a plurality of turns is disposed between first and second magnetic layers being substantially in parallel with each other, through upper and lower inorganic insulator layers, and in which a part of the outermost turn of the conductor coil is exposed on a face opposite a magnetic recording medium along with the upper and lower inorganic insulator layers, to form a magnetic gap. This head can be readily manufactured by a manufacturing method including the step of forming the outermost turn of the conductor coil on the side of the face opposite the magnetic recording medium so as to be wider than any other part of the conductor coil, and the step of thereafter machining the face opposite the magnetic recording medium so as to expose the outermost turn of the conductor coil on the face opposite the magnetic recording medium. The magnetic head of the present invention is suited to high-density recording, and is high in recording and reproducing efficiencies and also in reliability.

U.S. Pat. No. 4,907,113 discloses a head including a read pole disposed between a pair of write poles spaced apart to form a gap there between. The read pole conducts flux to a flux sensor that is located away from the gap. The head can be utilized for both longitudinal and perpendicular recording and the readback function can be carried out by an inductive coil or flux sensing devices such as a Hall sensor or an MR sensor. The recording head achieves high readback resolution, high write field gradients, and the capability for write wide-read narrow. The read pole and write poles are laminated structures.

SUMMARY OF THE INVENTION

It is an object of the present invention to provide a magnetic head for perpendicular recording including a main pole extending from an air bearing surface, an auxiliary pole, having a throat height measured from the ABS, and a gap layer separating the main pole from the auxiliary pole. The gap layer is in contact with at least a portion of the main pole, the gap layer is also in contact with at least a portion of the auxiliary pole, wherein the gap layer extends from the ABS a distance L1. The distance L1 is greater than the throat height but less than five microns.

It is another object of the present invention to provide a method for making a magnetic head for perpendicular recording having an auxiliary pole with reduced corrosion including depositing a main pole having a top surface, depositing a gap layer on the top surface, and depositing an auxiliary pole on the gap layer, the auxiliary pole having a projected area covering a portion of the gap layer. The method further includes etching a portion of the gap layer, subsequent to depositing the auxiliary pole, such that a remaining portion of the gap layer is greater than the projected area.

It is yet another object of the present invention to provide method for making a magnetic head for perpendicular recording including depositing a main pole having a top surface, depositing a gap layer on the top surface, depositing an auxiliary pole on the gap layer, the auxiliary pole having a throat height measured from a projected location of an air bearing surface, etching a portion of the gap layer subsequent to depositing the auxiliary pole such that a remaining portion of the gap layer extends from the projected location of the air bearing surface a distance L1, the distance L1 being greater than the throat height but less than five microns.

BRIEF DESCRIPTION OF THE DRAWINGS

The present invention will be better understood when consideration is given to the following detailed description thereof. Such description makes reference to the annexed drawings, wherein.

DETAILED DESCRIPTION OF THE PREFERRED EMBODIMENTS

In subsequent discussion, the term "auxiliary pole" shall be used interchangeably for trailing shields, wrap around shields or similar structures.

The present invention discloses an improved method and structure for making perpendicular write heads by reducing corrosion of auxiliary poles subsequent to electroplating of these structures, and prior to protective encapsulation. Intermediate photo-resist stripping steps occurring after auxiliary pole deposition can expose these structures to an aqueous environment, causing corrosion of these shield structures, particularly iron containing shields. Corrosion may also occur during subsequent metrology steps which expose the unprotected structures to adsorbed moisture in the environment. For very sensitive structures like auxiliary poles, any corrosion may subsequently impact critical throat dimensions above the write pole, particularly if pitting or oxidation occurs on the surface opposing the ABS (toward the back of the shield). For throat dimensions on the order of 50 nm, even a few nm of corrosion can materially impact the operation of the auxiliary pole. It is a discovered advantage of the present invention that this potential corrosion can be reduced considerably by making at least a top layer of the gap from a noble metal, and extending the gap from underneath the auxiliary pole a pre-determined distance. The "isolated island" of noble gap surface creates an unexpected passivation of the auxiliary pole alloy, reducing corrosion of the auxiliary pole for a period sufficient to encapsulate the structure permanently in subsequent deposition steps.

FIGS. 1-4 have been discussed previously in the Background section.

Figure 5:
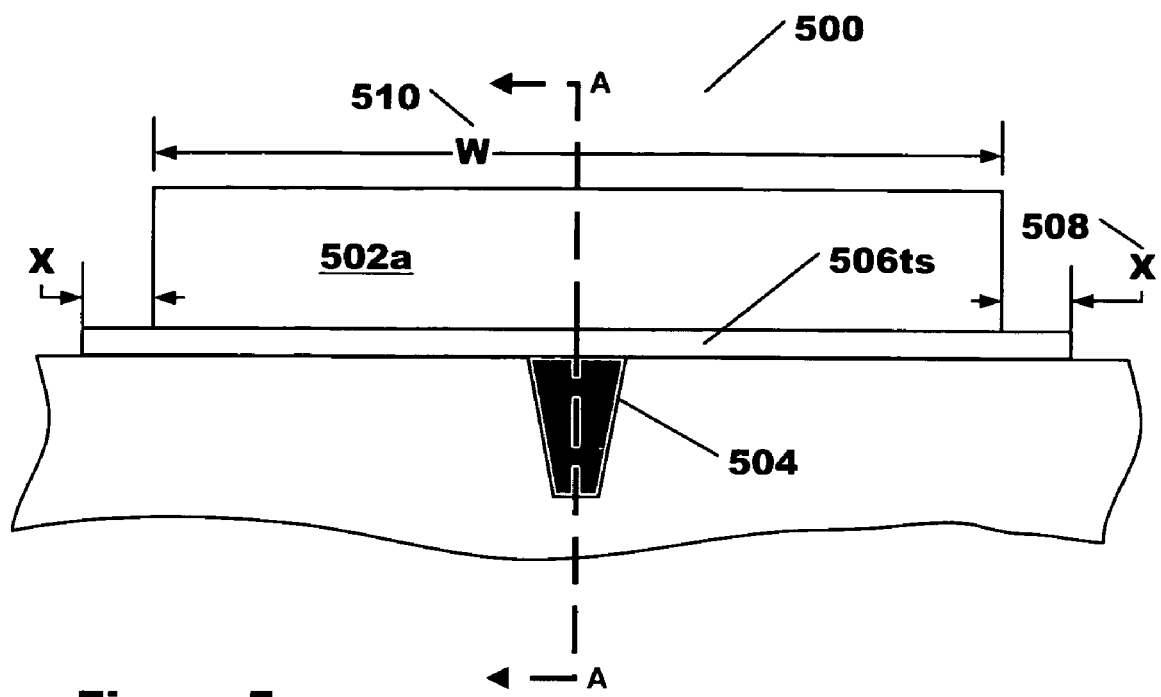
FIG. 5 is a partial cross sectional view looking into the air bearing surface of a perpendicular head write pole and trailing shield structure in accordance with an embodiment of the present invention.

FIG. 5 is a partial cross sectional view 500 looking into the air bearing surface of a perpendicular head write pole and trailing shield structure in accordance with an embodiment of the present invention. Note this drawing is not to scale, and the features are exaggerated for clarity. Gap layer 506*ts* is situated between write pole 504 and trailing shield 502*a*. Trailing shield 502*a* is deposited with a width W (510) such that gap layer 506*ts* extends from underneath shield 502*a* by a dimension X (508), such that the top surface of gap layer 506*ts* is exposed to the same wet environment as shield 502*a*. Trailing shield 502*a* is generally composed of NiFe or CoNiFe alloys. Gap layer 506*ts* may be comprised of a non-magnetic material having at least a top layer of a noble metal or precious metal. For example, one embodiment of the present invention provides a gap layer 506*ts* comprising an alumina lower layer and a noble metal upper layer, wherein the upper metal layer is chosen from Au, Pd, Pt, Ir, Rh, Ru, and their alloys. The upper layer acts as both a corrosion passivation layer as well as a plating deposition seed layer for the shield 502*a*. In another embodiment of the present invention, the lower layer may be one metal selected from the group Au, Pd, Pt, Ir, Rh, Ru, and their alloys, and the upper layer selected from the same group, where the lower and upper layers comprise different alloys or elements. This may be done for cost reasons or to optimize the performance of the two layers. For example, the lower layer may Rh, chosen for its adhesion to the substrate (or the pole material), and the upper layer Au, chosen for low cost. In yet another embodiment of the present invention, gap layer 502*a* may comprise a uniform metal composition, the metals selected from Au, Pd, Pt, Ir, Rh, Ru, and their alloys. In this case, Rh and Ru are preferred. Views looking into the cross section at A-A are shown in FIGS. 7*a,b*.

Figure 6:
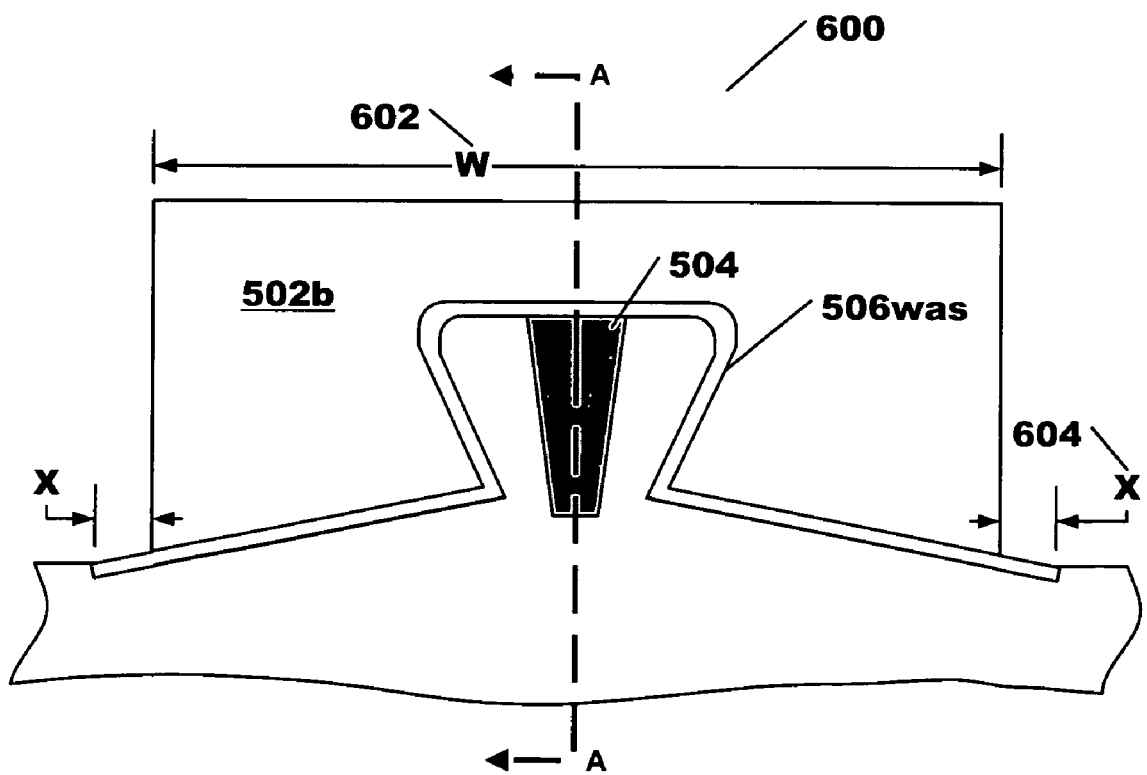
FIG. 6 is a partial cross sectional view looking into the air bearing surface of a perpendicular head write pole and wrap around shield structure in accordance with an embodiment of the present invention.

FIG. 6 is a partial cross sectional view 600 looking into the air bearing surface of a perpendicular head write pole and wrap around shield structure in accordance with an embodiment of the present invention. Note this drawing is not to scale, and the features are exaggerated for clarity. In this embodiment, gap layer 506*was* and shield 502*b* "wrap around" write pole 504 as shown. Wrap around shield 502*b* is deposited with a width W (510) such that gap layer 506*ts* extends from underneath shield 502*a* by a dimension X (604), such that the top surface of gap layer 506*was* is exposed to the same wet environment as shield 502*b*. In this case, for a gap with two layers, the upper layer is the layer in contact with the wrap around shield structure 502*b*. Otherwise, the criteria and limitations disclosed for the embodiments describing gap layer 506*ts* apply to gap layer 506*was* as well. Wrap around shield 502*b* is generally composed of NiFe or CoNiFe alloys. Views looking into the cross section at A-A are shown in FIGS. 7*a,b*.

Figure 1:
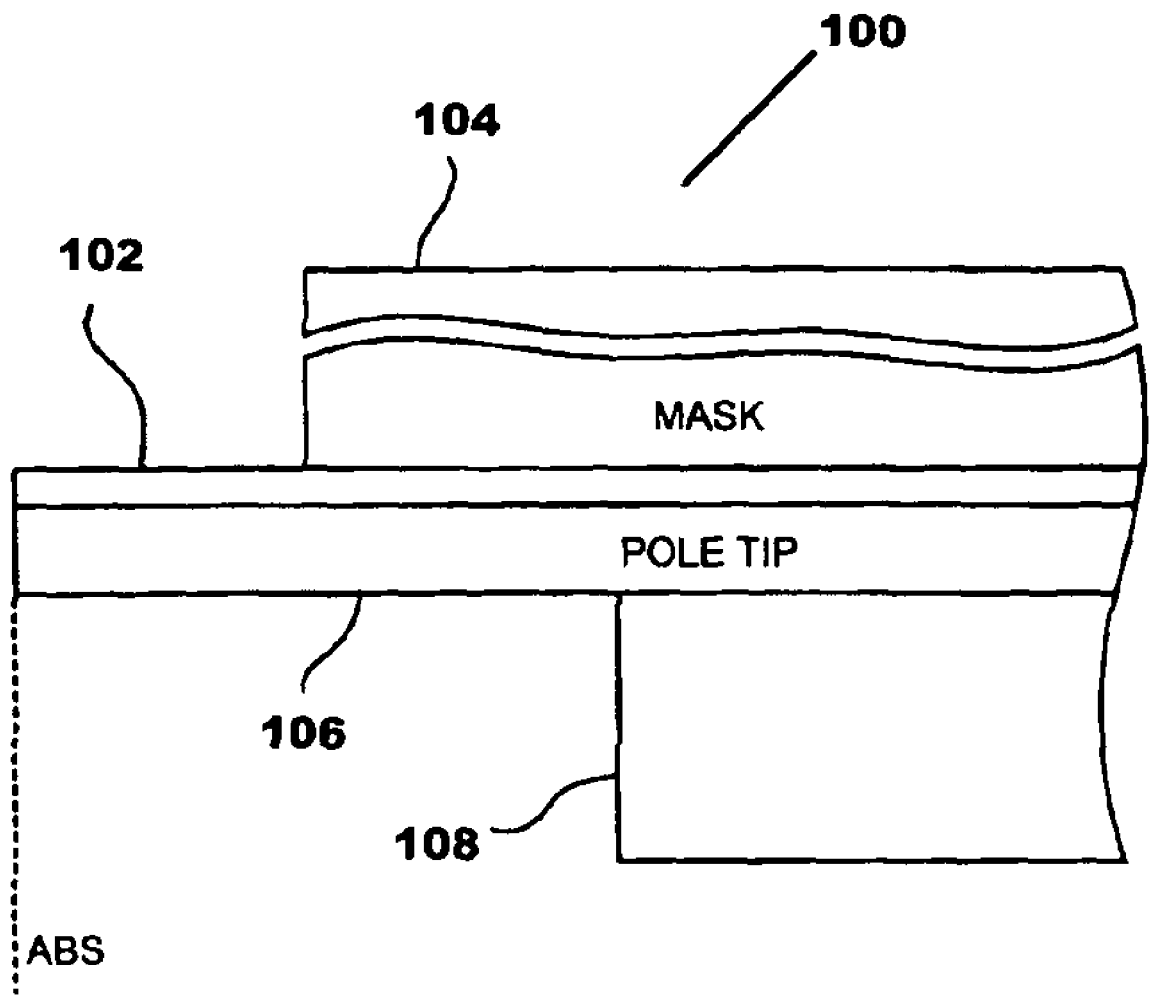
FIG. 1 (Prior Art) is partial cross sectional view of a perpendicular write pole prior to deposition of the trailing shield structure.
Figure 2:
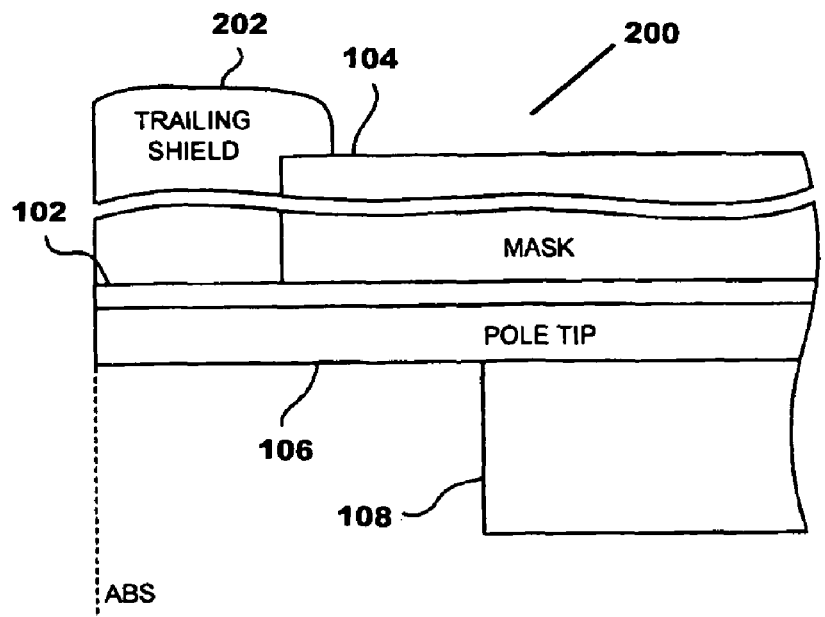
FIG. 2 (Prior Art) is partial cross sectional view of a perpendicular write pole subsequent to deposition of trailing shield structure.
Figure 3:
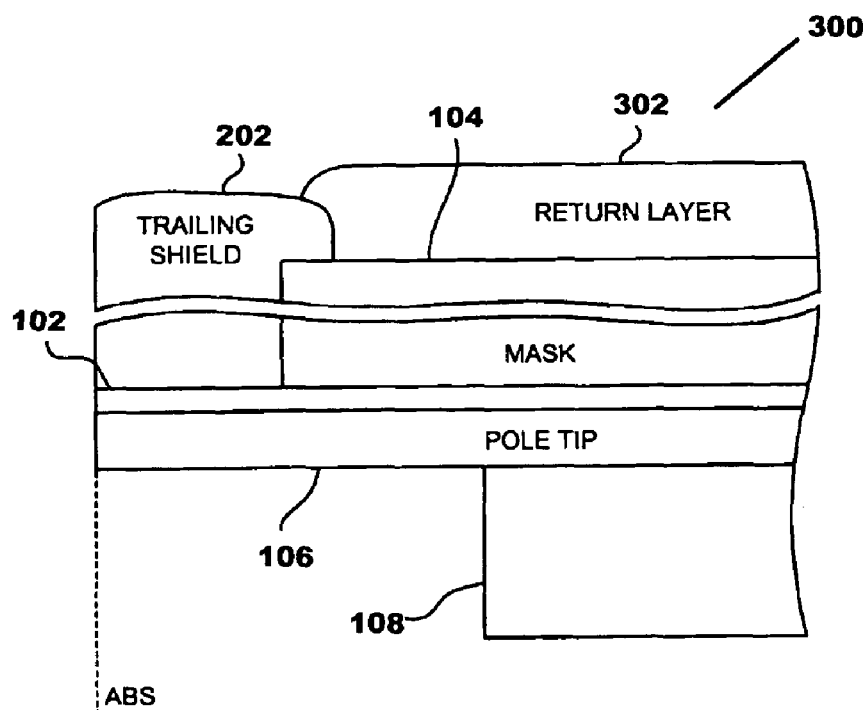
FIG. 3 (Prior Art) is a partial cross sectional view of a perpendicular write pole subsequent to deposition of a return layer.
Figure 4:
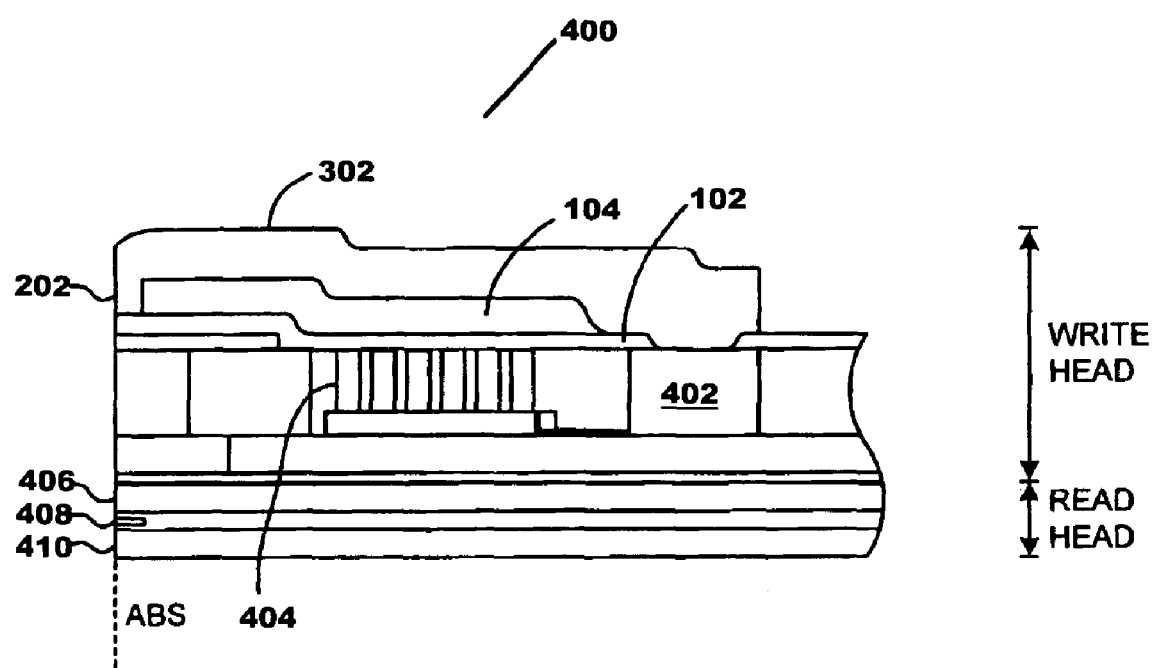
FIG. 4 (Prior Art) is a cross sectional view of a read/write head structure.
Figure 7A:
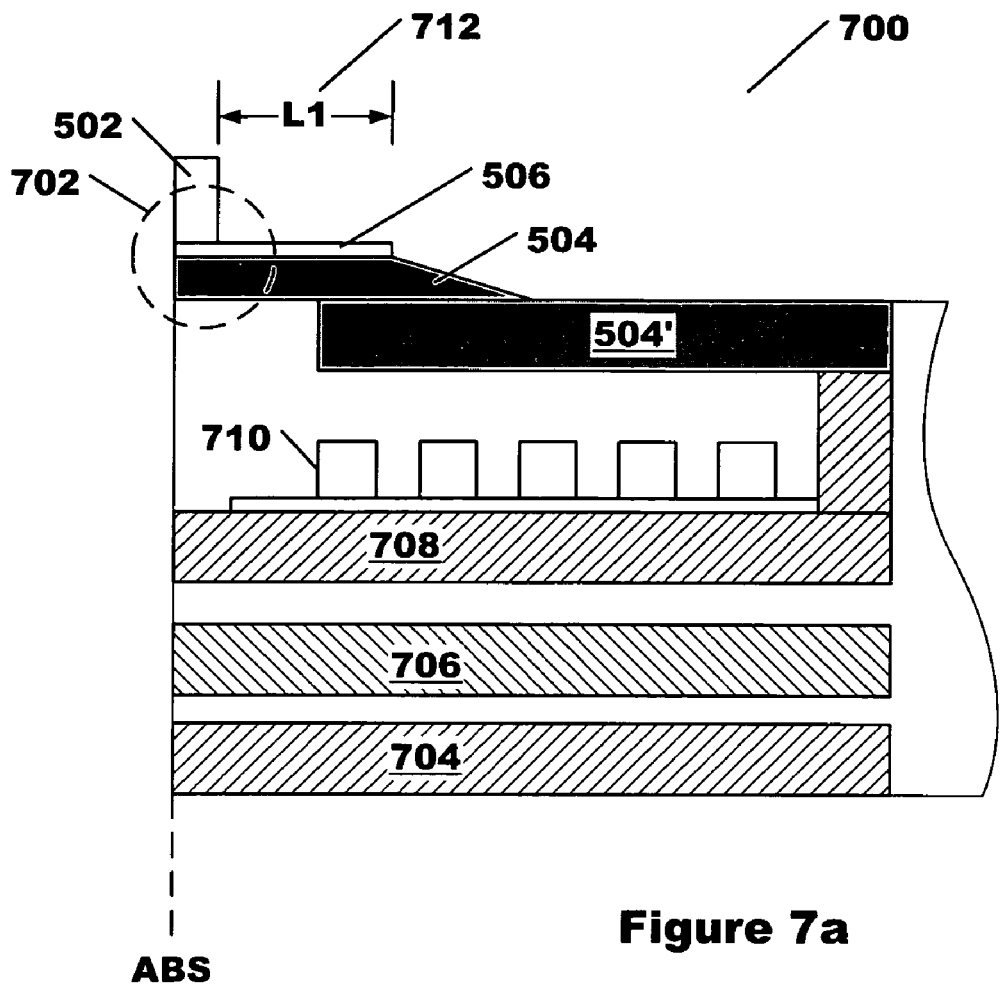
FIG. 7a is a partial cross sectional view of section A-A in FIGS. 5, 6 of a perpendicular write head with an auxiliary pole structure in accordance with an embodiment of the present invention.

FIG. 7*a* is a partial cross sectional view 700 of section A-A in FIGS. 5, 6 of a perpendicular read/write head with an auxiliary pole structure in accordance with an embodiment of the present invention. This view represents a cross section through A-A for both shield embodiments. Details are not to scale. The read head portion comprises first shield layer 704 and second shield layer 706. Between these layers resides the read sensor (not shown). The write head portion comprises return pole 708, write coils 710, stitched pole 504', and main pole 504. Above the main pole 504 is gap layer 506, which can be either 506ts or 506was of FIGS. 5, 6. Auxiliary pole 502, which can represent either a trailing shield 502a or wrap around shield 502b, is situated above gap layer 506. Gap layer 506 is extended a distance L1 (712) from the rear surface of auxiliary pole 502 (the surface opposing the ABS). Distance L1 is limited to a maximum of 5 microns, and as such does not extend the full length of pole 504', as are gap layers of the prior art (FIG. 4). The distance L1 is limited to provide optimized corrosion protection of auxiliary pole 502, and to avoid contact with other structures and materials that could introduce electrochemical couples which may reverse the corrosion protection of auxiliary pole 502. Detail 702 shows an expanded view of the gap 506 in FIG. 7b.

In the manufacturing process, the read/write head structure is built upward from layer 704 to write pole layers 504 and 504'. Note that the ABS is not formed at this point, and that many of the layers extend across the ABS of FIG. 7a. Gap layer 506 is then deposited over pole layers 504, 504' via a suitable deposition process, which may include evaporation, atomic layer deposition, PECVD, CVD, sputtering, or electroplating, depending on the material in the gap layer. Location and dimensions of auxiliary pole 502 are defined by a photo-resist layer deposited on the gap layer 505, and auxiliary pole 502 is deposited on the gap layer via electroplating. The gap layer 506 is re-masked with photo-resist to define final gap film dimensions. Ion milling or another suitable etch process is used to remove unwanted material from the gap layer. The masking photo resist layer covering the gap layer 506 and auxiliary pole structure 502 is removed via an aqueous stripping solution. During this stripping process, the auxiliary pole structure 502 is susceptible to corrosion. An important aspect of the present invention is that the exposed upper surface of the patterned gap layer 506, comprising a noble metal or noble metal alloy, protects the auxiliary pole structure 502 from corrosion, provided a sufficient area of the gap layer 506 is exposed to the same environment along with auxiliary pole 502. This result is somewhat unexpected, since metals of less noble chemical nature (such as Fe, Ni) usually corrode in preference to metals of more noble chemical nature (such as Au, Ru, Rh) when they are in contact in solution. However, testing performed during the manufacture of perpendicular write heads containing trailing and wrap around shields and exposed gap layers of the present invention confirm the reduced levels of corrosion. Additionally, it has been found that the corrosion protection can be extended by coupling the gap layers of adjacent devices within the same wafer (see FIG. 8 below).

Figure 7B:
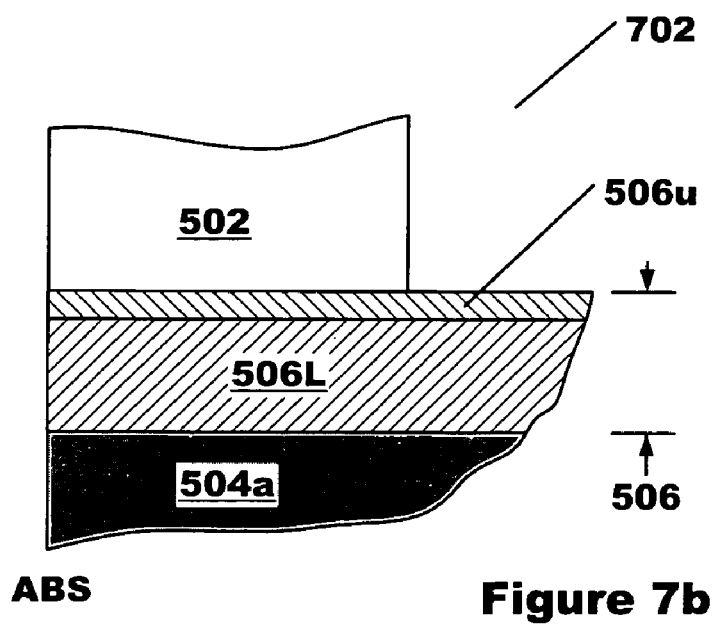
FIG. 7b is a partial cross sectional view of detail 702 of FIG. 7a in accordance with an embodiment of the present invention.

FIG. 7b is a partial cross sectional view of detail 702 of FIG. 7a in accordance with an embodiment of the present invention. For the case of a dual layer gap layer 506, and upper layer 506u and a lower layer 506L are shown. For dual gap layers, the upper layer 506u is a noble metal or noble metal alloy. The lower layer may be constructed of any non magnetic material, including an electrical insulator such as alumina, another noble metal, or noble metal alloy. The choice of materials in each layer, as well as the upper layer thickness and lower layer thickness may be determined by a number of factors. These factors include adhesion to substrate and/or main pole materials, adhesion to each other, adhesion of the auxiliary pole layer 502 to the upper gap layer, and optical properties that impact lithography. These factors may be taken together with cost to determine the final configuration. Noble metals are selected from the group Au, Pd, Pt, Ir, Rh, Ru, and their alloys. Generally, the upper layer 506u thickness is greater than about 20 to 30 angstroms, or 2 to 3 nm. The total gap thickness will range from about 30 nm to about 50 nm, depending on the track width desired.

Figure 8:
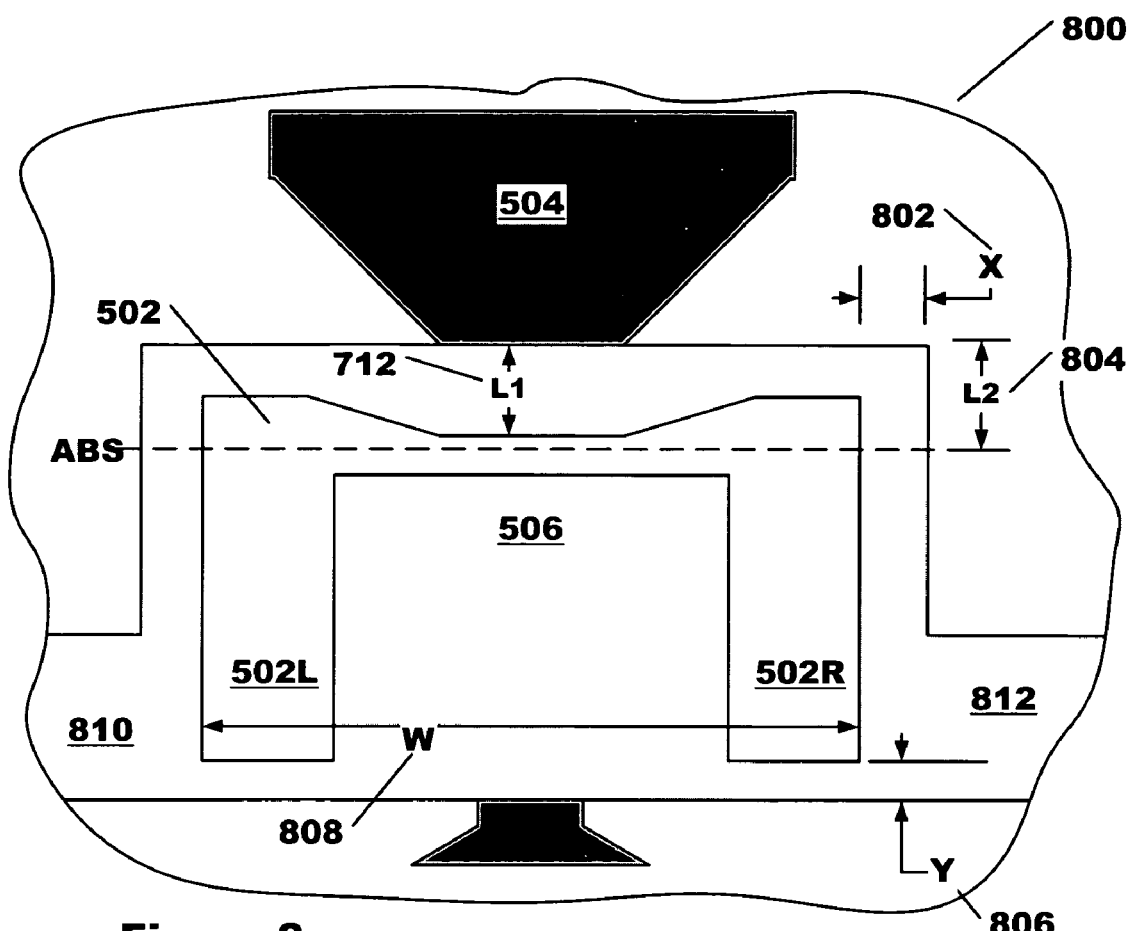
FIG. 8 is a top wafer plane view of an auxiliary pole and underlying gap layer in accordance with an embodiment of the present invention; and, FIG. 9 is a top wafer plane view of an auxiliary pole and underlying gap layer subsequent to the formation of the air bearing surface.

FIG. 8 is a top wafer plane view 800 of an auxiliary pole and underlying gap layer in accordance with an embodiment of the present invention. The drawing represents a partial wafer plane view of a perpendicular write head device of FIG. 7a subsequent to the deposition and patterning of the auxiliary pole 502 and gap layer 506. A dashed line represents the projected location of the ABS. Attached to auxiliary pole 502 are rectangular segments 502L and 502R, which are called anchor pads. These are used by metrology tools to determine the correct deposition thickness of auxiliary pole 502, and are subsequently removed during formation of the ABS. The gap layer 506 extends beyond the perimeter of auxiliary pole 502 (and the anchor pads) to provide corrosion protection of the shield. Left and right of auxiliary pole 502 at the projected ABS position, the gap layer extends by a distance X (802). From the projected position of the ABS, the gap layer is extended by a distance L2 (804), which is distance L1 (712) plus the throat height of the auxiliary pole at the pole tip. Below the bottom edges of anchor pads 502L and 502R, the gap is extended by a distance Y. To further enhance corrosion protection, another embodiment of the present invention extends the gap layer to adjacent devices (not shown) via segments 810 and 812. These extensions couple the gap layers of all devices within a horizontal row on the wafer, maximizing the exposed area of the noble metal gap layer. At the end of each row of devices, a vertical connecting "bus bar" (not shown) may be optionally employed to electrically couple the gap layers of multiple rows of devices. Although the description above has addressed generic auxiliary pole embodiments, the figure would look essentially identical for both the trailing shield and wrap around shield embodiments, save a small area in the vicinity of the main pole (which is less than 100 nm wide) where the wrap around shield extends around the main pole.

For optimized corrosion protection, according to an embodiment of the present invention, distance L1 (712) should be between about 0.5 and 5 microns. Distance X (802) should be approximately five times distance L1, or between approximately 2.5 and 25 microns. Distance Y should be approximately 3 to 10 times distance L1, or between approximately 1.5 and 50 microns. Distance L2 is the width of the gap layer 506 (at the main pole) measured from the ABS. Since the throat height of the auxiliary pole 502 is small compared to the distance L1, L2 can also be dimensioned between 0.5 and 5 microns.

Figure 9:
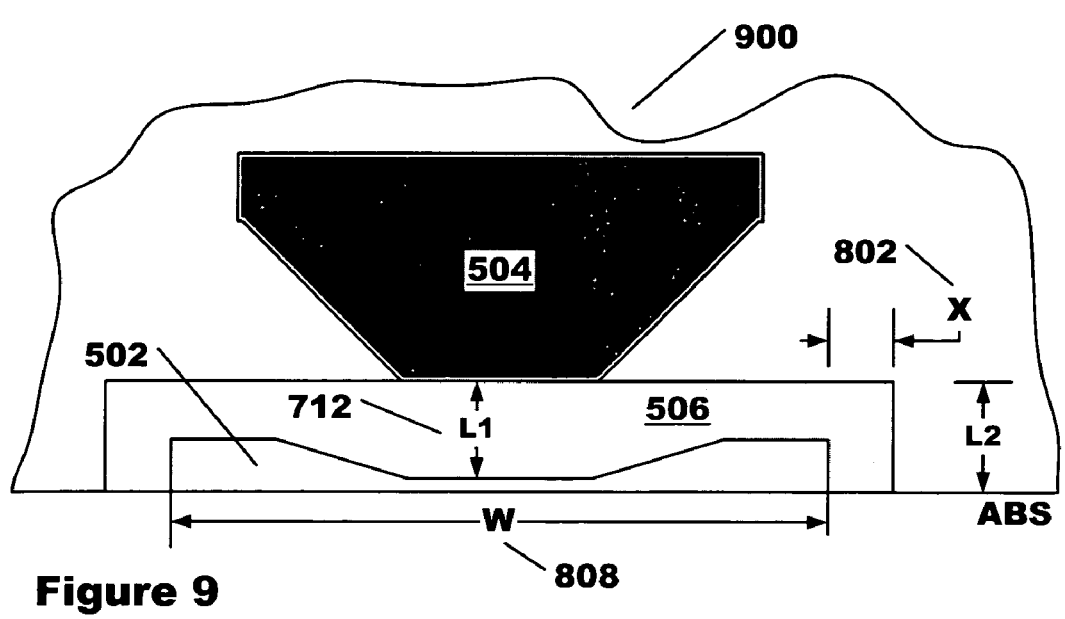

FIG. 9 is a top wafer plane view 900 of an auxiliary pole and underlying gap layer subsequent to the formation of the air bearing surface. This is a partial wafer plane (top) view of the structure in FIG. 7a. After formation of the air bearing surface, the gap layer 506 should extend beyond the left or right edges of the auxiliary pole 502 by a distance X (802) of approximately five times L1, or have a total width at the ABS of W+10×L1. Distance L1, measured from the rear surface of auxiliary pole 502 to the rear edge of gap layer 506 (at the main pole), shall be between 0.5 to 5 microns. The width of the gap layer 506, as measured from the ABS just over the main pole, shall be between 0.5 and 5 microns.

The present invention is not limited by the previous embodiments heretofore described. Rather, the scope of the present invention is to be defined by these descriptions taken together with the attached claims and their equivalents.

What is claimed is:

1. A method for making a magnetic head for perpendicular recording comprising:

depositing a main pole having a top surface;

depositing a gap layer on said top surface, said gap layer having an electrically conductive upper surface;

depositing an auxiliary pole on said electrically conductive upper surface of said gap layer, said auxiliary pole having a throat height measured from a projected location of an air bearing surface; and etching a portion of said gap layer subsequent to depositing said auxiliary pole such that a remaining portion of said electrically conductive upper surface of said gap layer extends from said projected location of said air bearing surface a distance L2, said distance L2 being greater than said throat height but less than five microns.

2. The method as recited in claim 1 wherein said auxiliary pole is a trailing shield.

3. The method as recited in claim 1 wherein said auxiliary pole is a wrap around shield.

4. The method as recited in claim 1 wherein said gap layer comprises a single layer.

5. The method as recited in claim 4 wherein said single layer is chosen from the group consisting essentially of Au, Pd, Pt, Ir, Rh, Ru, and their alloys.

6. The method as recited in claim 1 wherein said gap layer comprises a dual layer.

7. The method as recited in claim 6 wherein said dual layer comprises a top layer and a bottom layer, said bottom layer in contact with at least a portion of said main pole, said top layer in contact with at least a portion of said auxiliary pole.

8. The method as recited in claim 7 wherein said top layer is chosen from the group consisting essentially of Au, Pd, Pt, Ir, Rh, Ru, and their alloys.

9. The method as recited in claim 7 wherein said bottom layer is a non-magnetic, electrically insulating material.

10. The method as recited in claim 9 wherein said bottom layer is alumina.

11. The method as recited in claim 7 wherein said bottom layer is chosen from the group consisting essentially of Au, Pd, Pt, Ir, Rh, Ru, and their alloys.

12. The method as recited in claim 7 wherein:

said top layer is chosen from the group consisting essentially of Au, Pd, Pt, Ir, Rh, Ru, and their alloys;

said bottom layer is chosen from the group consisting essentially of Au, Pd, Pt, Ir, Rh, Ru, and their alloys; and said top layer and said bottom layer have different elemental compositions.

13. The method as recited in claim 1 wherein said distance L2 is greater than 1.5 microns.

* * * * *